United States Patent [19]

Sugita

[11] Patent Number: 4,471,862
[45] Date of Patent: Sep. 18, 1984

[54] SEALING STRUCTURE IN AIR COMPRESSOR

[75] Inventor: Terumitsu Sugita, Narashino, Japan
[73] Assignee: Seiko Seiki Kabushiki Kaisha, Chiba, Japan
[21] Appl. No.: 373,256
[22] Filed: Apr. 29, 1982

[30] Foreign Application Priority Data

May 8, 1981 [JP] Japan .............................. 56-66521[U]

[51] Int. Cl.³ ........................................... F16D 27/10
[52] U.S. Cl. ................................. 192/84 C; 277/152; 417/319
[58] Field of Search .................. 192/84 C; 277/3, 27, 277/152, 153; 417/319

[56] References Cited

U.S. PATENT DOCUMENTS

| | | | |
|---|---|---|---|
| 3,306,683 | 2/1967 | Deuring | 277/153 |
| 4,010,960 | 3/1977 | Martin | 277/3 |
| 4,069,572 | 1/1978 | Pierce et al. | 192/84 C |
| 4,186,929 | 2/1980 | Burton et al. | 277/27 |

OTHER PUBLICATIONS

"Flange Type Seals for Ball and Roller Bearing Applications", Product Engineering, pp. 122–123.

Primary Examiner—Rodney H. Bonck
Assistant Examiner—James J. Merek
Attorney, Agent, or Firm—Robert E. Burns; Emmanuel J. Lobato; Bruce L. Adams

[57] ABSTRACT

An air compressor has a front side block through which extends a rotor shaft, and a front head is attached to the front side block and has a cylindrical portion spaced from the rotor shaft. A sealing device is interposed between the inner periphery of the cylindrical portion and the rotor shaft. A pulley is rotatably mounted on the outer periphery of the cylindrical portion by means of a ball bearing assembly. A ring-shaped interference plate is attached to the inner periphery of the pulley front end and the plate projects inwardly in axially-spaced relation from the ball bearing assembly to define a collection space along the inner periphery of the pulley front end in the region between the ball bearing assembly and the plate for collecting oil which leaks from the air compressor. The inwardly projecting part of the interference plate terminates in an angled lip which is spaced from the cylindrical portion of the front head to define therebetween a passage through which the leaked oil passes for collection in the collection space. A ring-shaped oil absorber is disposed adjacent the interference plate for absorbing oil collected in the collection space.

8 Claims, 3 Drawing Figures

SEALING STRUCTURE IN AIR COMPRESSOR

BACKGROUND OF THE INVENTION

The present invention relates to a sealing device in an air compressor, used particularly for comparatively small cooling devices such as a car cooler, to prevent lubrication oil and grease from scattering outside from a clutch device.

Generally, a rotary compressor comprises a cylinder chamber made up of a cylindrical cylinder and two side blocks parallelly provided at both sides of the cylinder; and a rotor having radially movable vanes positioned rotatably in the cylinder chamber to divide it into plural working chambers; whereby the desired compressing operation can be carried out by the rotor rotation.

When this type air compressor is used for cooling devices such as a car cooler, the rotation of the car engine is transmitted from the output shaft of the engine to the rotor shaft of the compressor projecting from the front side block by way of a transmission device comprising a pulley and belt assembly and a clutch device.

FIG. 1 shows an embodiment of a conventional power transmission device of an air compressor having a compressor body 1 which comprises a rotor shaft 3 projected from a front side block 2, a front head 5 attached to the front side block 2 and forming a coaxial cylindrical portion 4 at the outer periphery of the rotor shaft 3, a mechanical sealing device made up of a seal ring 6 interposed between the inner periphery of the cylindrical portion 4 and the rotor shaft 3, rollers 7 and 8 and a cover plate 9, and an oil absorber 10 such as felt attached to an end of the inner periphery of the cylindrical portion 4. The cylindrical portion 4 rotatably encased in a pulley 12 via a ball bearing assembly 11. By entraining a belt (not shown) around the pulley 12 via the ball bearing 11, the rotational force from an output shaft of a car engine is transmitted to the rotor. A solenoid core 13 making up an electromagnetic clutch is housed in the pulley 12.

An attach plate 14 is held between the rotor shaft 3 and rotor front end, an armature 15 is positioned at a pulley front end 12 and faces the solenoid core 13, and a plate spring 16 is interposed between the armature 15 and a holding plate 17 to urge the armature 15 to be apart from the pulley end 12 by a minute spacing distance d. When the solenoid core 13 is demagnetized, the armature 15 is apart from the pulley end 12, i.e., the clutch is in a disengaged condition. When the solenoid core 13 is excited, the armature 15 is attracted to the pulley end 12, and the clutch is connected by the friction engagement of the two.

In such an air compressor provided with the clutch device, however, a lubrication oil leaks from the sealing portion of the air compressor body 1 and the rotor shaft 3, and the grease of the bearing 11 easily leaks out. Conventionally, the oil leakage from the air compressor body 1 has been prevented by the mechanical sealing device or absorbed by the oil absorber 10, and the grease leakage from the bearing 11 has been prevented by the bearing seal. Nevertheless, a small quantity of oil tends to be scattered from the outer periphery of the oil absorber 10 by centrifugal force, and the grease melts due to the high temperature and is scattered by centrifugal force and distributed to the pulley front end 12 whereby it is scattered to the outer periphery of the compressor along the spaced "d" between pulley 12 and the armature 15. Consequently the areas provided at the surroundings of the compressor, such as the bonnet, become stained, and further the grease adheres to the contact surface of the pulley 12 and the armature 15 to deteriorate the transmission torque of the clutch device.

The present invention aims to eliminate the above noted drawbacks, and therefore it is an object of the present invention to prevent the distribution of oil leaked from the compressor body through the mechanical sealing device and grease leaked from the bearing to the surroundings.

The present invention aims to achieve the above noted object by providing a ring-shaped interference plate having substantially an L-shaped section at the inner periphery of a pulley front end.

Figure 1:
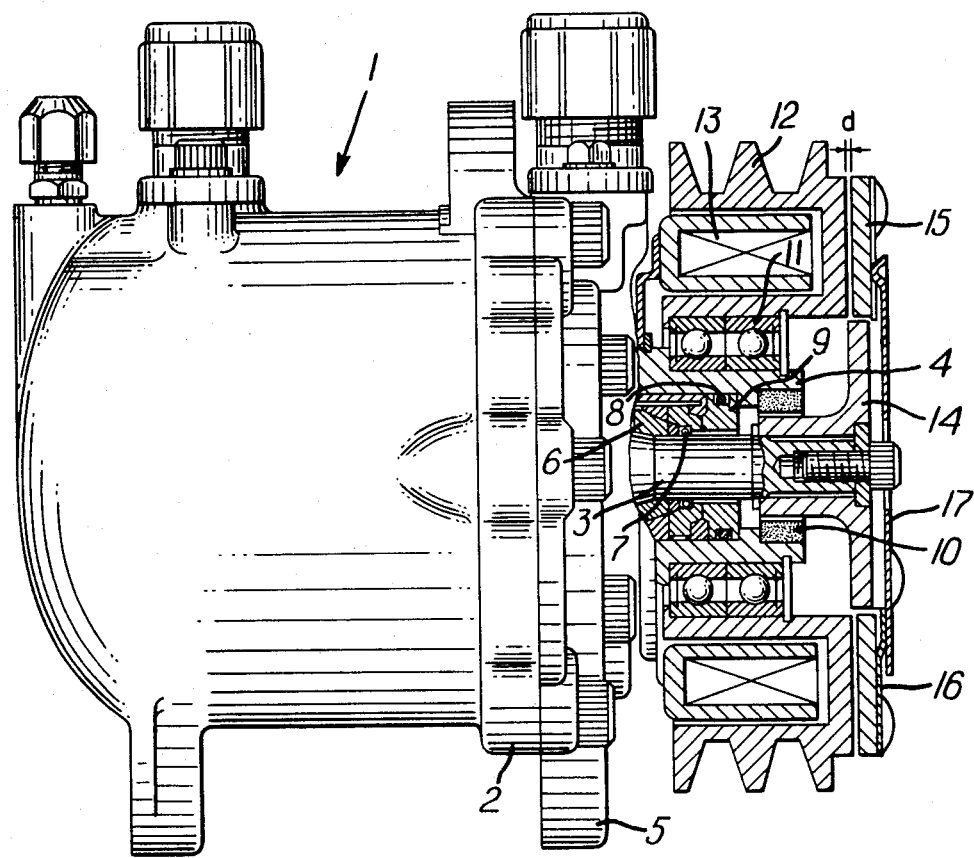
FIG. 1 is a sectional view of a power transmission device of a conventional air compressor.
Figure 3:
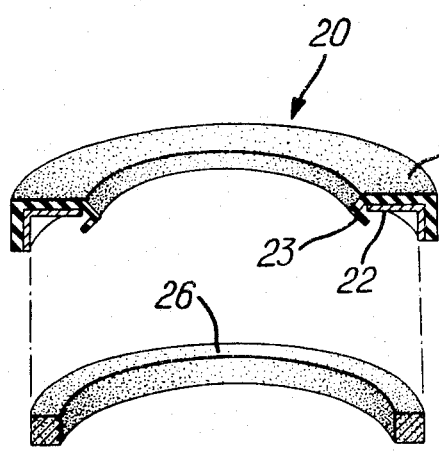
FIG. 3 is a perspective view of a partially sectional view of the interference plate and the oil absorber.

Hereinafter an embodiment of the present invention will be illustrated in conjunction with FIGS. 2 and 3.

Like parts in the conventional compressor and the present invention have been designated by the same reference numerals, and the essential parts of this invention are designated by different reference numerals.

Figure 2:
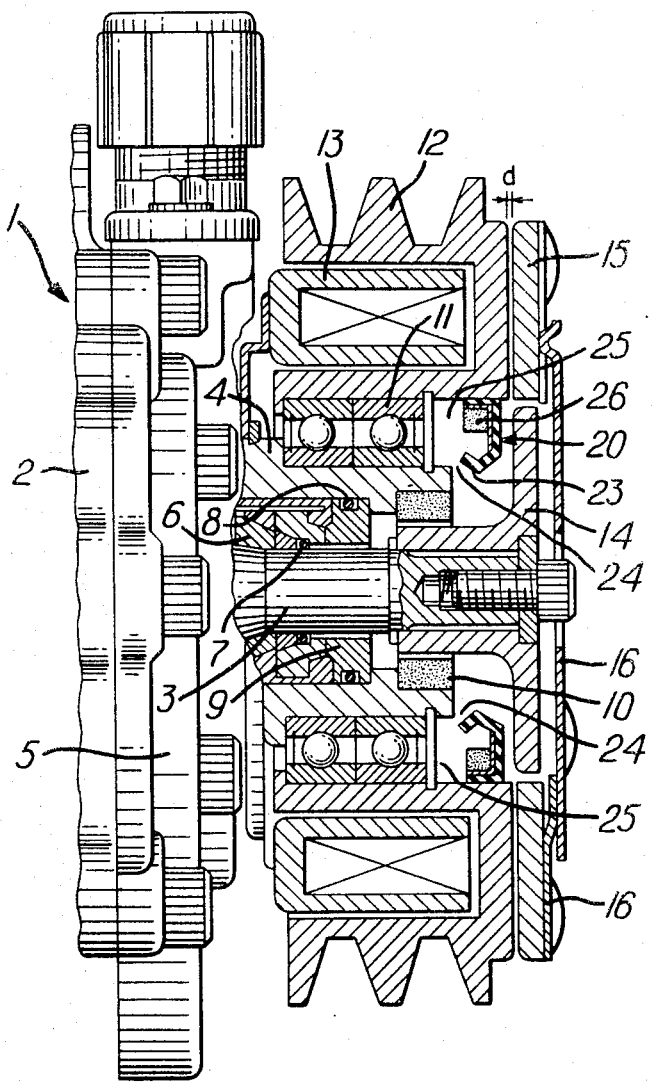
FIG. 2 is a sectional view of a power transmission device of an air compressor according to the present invention.

In FIG. 2, a ring-shaped interference plate 20 having substantially an L-shaped section is fit into the inner periphery of the pulley front end 12. The interference plate 20 is shown in FIG. 3 and comprises a ring-shaped interference plate body 21 made of rubber and a reinforcing core member 22 such as steel plate inserted into the inner periphery of the interference plate body 21 to keep the shape of the interference plate body 21 and maintain the fitting strength thereof against the inner periphery of the pulley 12, Further a lip member 23 having an angled or bent in "∠" shape is provided at the inner periphery of the interference plate body 21 and is formed in one body therewith. The interference plate 20 is fit into and attached to the inner periphery of the pulley front end 12, bending the lip member 23 inside, and forms a labyrinth between the cylindrical portion front end 4 and the inner periphery of the pulley. Further an introduction passage 24 is formed between the outer periphery of the cylindrical portion end 4 and the lip member 23. Consequently the oil scattered through the mechanical sealing device from the outer periphery of the oil absorber end 10 by the centrifugal force produced by the rotor rotation contacts with the lip member 23, and is introduced by the centrifugal force through the introduction passage 24 and collected in a collection space 25 formed on the inner side of the interference plate 20.

A ring-shaped oil absorber 26 made of multipolar material such as felt is fit into the interference plate 20 to absorb the oil introduced into the space 25 and the melted grease leaked from the bearing 11. As a result, the oil and grease introduced into the space 25 by gravity is prevented from shifting when the engine stops, i.e., the pulley stops rotating, and the oil and grease collected in the space 25 penetrates into the oil absorber 26 uniformly.

The quantity of oil included in the bearing 11 is very small and the oil inside the compressor body 1 is satisfactory sealed by the mechanical sealing device. Accordingly, the leaked grease or oil can be sufficiently absorbed by the oil absorber since the quantity of oil or grease introduced into the collection space defined by the interference plate 20 is very small.

As illustrated, in a sealing structure for an air compressor according to the present invention, the scattering of the lubrication oil and grease from the clutch portion to the outside can be prevented and the surroundings of the compressor are prevented from being stained. Since the interference plate is fixed to the inner periphery of the pulley front end, the leaked oil and grease are held by the plate. Consequently, the transmission of the torque is not deteriorated by the oil and grease adhered to the contact surface of the pulley and armature. Moreover, the present invention is advantageous in that the problem such as the oil leak of the air compressor can be easily solved by providing the interference plate without otherwise changing the essential construction of the compressor.

I claim:

1. A sealing structure in an air compressor, comprising:
    a rotor shaft projecting from a front side block of a compressor body;
    a front head attached to the front side block and forming a coaxial cylindrical portion at the outer periphery of the rotor shaft;
    a sealing device interposed between the inner periphery of the cylindrical portion and the rotor shaft;
    a pulley rotatably mounted on the outer periphery of the cylindrical portion via a ball bearing assembly;
    an excitable solenoid core housed in the pulley;
    an armature at the pulley front end facing the solenoid core;
    spring means urging the armature in a direction away from the pulley front end;
    a clutch device for transmitting the pulley rotation to the rotor shaft by releasably connecting the armature to the pulley end in response to exciting the solenoid core; and
    a ring-shaped interference plate having a substantially L-shaped section attached to the inner periphery of the pulley front end, the plate projecting inwardly from the inner periphery of the pulley front end and being axially spaced from the ball bearing assembly to define a collection space along the inner periphery of the pulley front end in the region between the ball bearing assembly and the plate for collecting oil which leaks from the air compressor.

2. A sealing structure in an air compressor as claimed in claim 1, further comprising an oil absorber disposed inside of the interference plate.

3. A sealing structure in an air compressor as claimed in claim 1, wherein the inwardly projecting part of the plate terminates in an angled lip which is spaced from the cylindrical portion of the front head to define therebetween a passage through which the leaked oil passes for collection in the collection space.

4. A sealing structure in an air compressor as claimed in claim 3, wherein the plate comprises a plate body of rubber and a reinforcing core member effective to reinforce the strength of the rubber plate body.

5. A sealing structure in an air compressor as claimed in claim 3, further including a ring-shaped oil absorber disposed adjacent the plate for absorbing oil collected in the collection space.

6. A sealing structure in an air compressor as claimed in claim 4, further including a ring-shaped oil absorber disposed adjacent the plate for absorbing oil collected in the collection space.

7. A sealing structure in an air compressor as claimed in claim 1, wherein the plate comprises a plate body of rubber and a reinforcing core member effective to reinforce the strength of the rubber plate body.

8. A sealing structure in an air compressor as claimed in claim 7, further including a ring-shaped oil absorber disposed adjacent the plate for absorbing oil collected in the collection space.

* * * * *